May 21, 1935.   W. R. KING   2,002,374
CONTROL SYSTEM
Filed May 30, 1930

Inventor:
William R. King,
by Charles V. Mullan
His Attorney.

Patented May 21, 1935

2,002,374

UNITED STATES PATENT OFFICE 2,002,374

CONTROL SYSTEM

William R. King, Schenectady, N. Y., assignor to General Electric Company, a corporation of New York Application May 30, 1930, Serial No. 457,589

4 Claims. (Cl. 164—68)

This invention relates to control systems, more particularly to electrical systems for controlling machines operating upon moving material, and it has for an object the provision of a simple, reliable and efficient control system for causing the machine to perform its operation in a predetermined relationship with respect to the position of the material.

In carrying this invention into effect in one form thereof, I provide means for controlling the operation of the machine and a light sensitive device controlled by the material for actuating the control means so as to cause the machine to operate in a predetermined relationship with respect to the material.

In illustrating the invention in one form thereof, I have shown it as applied to a machine for cutting a continuously moving strip of material, such for example as paper or cloth, in registry with or in predetermined relationship with respect to markings such as wording or designs printed thereon at successive intervals.

Figure 1:
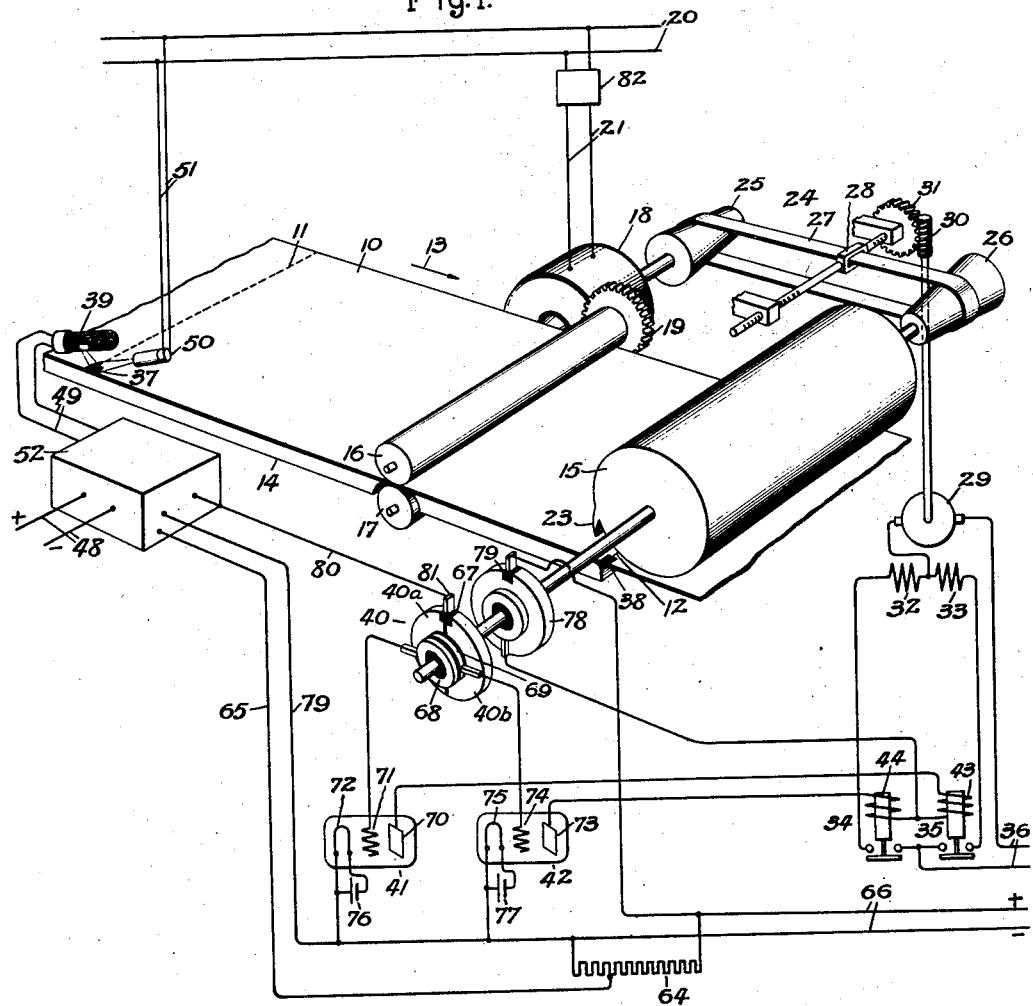
Figure 2:
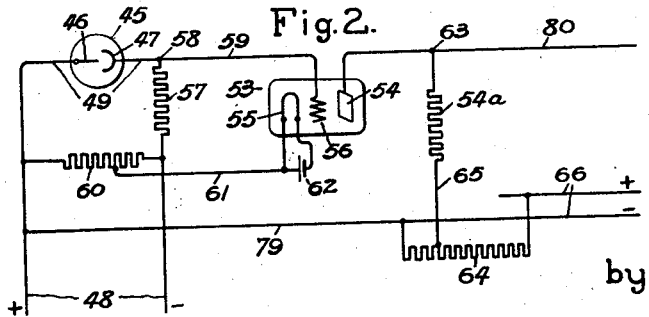

For a better and more complete understanding of the invention reference should now be had to the following specification and to the accompanying drawing, in which Fig. 1 is a simple diagrammatic representation of a machine and a control system therefor embodying the invention and Fig. 2 is a diagrammatic illustration of a detail of the control circuit.

Referring now to the drawing, I have shown my invention in one form in connection with a strip 10 of material, such for example as paper or cloth, which may be provided with wording or designs printed on each of the various sections of the strips between the lines 11 and 12, at which lines it is desired to sever the strip for the purpose of forming articles such for example as carton wrappings, bags or sacks.

The strip is fed in the direction of the arrow 13 from a supply roll (not shown) over a table 14 to a cutter roll 15 by means of the upper and lower feed rolls 16 and 17, respectively. As shown in the drawing, the feed rolls 16 and 17 are driven at a suitable speed, which is preferably substantially constant, by means of an electric motor 18 to the drive shaft of which the rolls are connected through suitable reduction gearing 19. The electric motor 18 may be either of the direct current or alternating current type and is supplied with electrical energy from any suitable source of power such as that represented in the drawing by the supply lines 20 to which the terminals of the motor are connected by means of the conductors 21.

The cutter may be driven by any suitable driving means the speed of which may be varied or adjusted to provide for adjusting the relative operating speeds of the cutter and the moving strip so as to cause the cutter to operate in a predetermined relationship with respect to the sections of the strip, i. e., to sever the strip at the predetermined cut-off lines 11, 12, etc. For the purposes of illustration, however, the cutter roll 15 is shown in the drawing as being driven by the electric motor 18, to the drive shaft of which the shaft of the cutter is connected by means of the variable speed transmission device 24 by means of which the relative operating speeds of the cutter and the strip may be adjusted as desired.

When the cutter roll is driven by the motor which drives the feed rolls, any suitable variable speed transmission device may be employed for varying the relative speeds of the cutter and the strip. The variable speed transmission device 24 is diagrammatically shown in the drawing as comprising the two oppositely disposed cone pulleys 25 and 26 fixedly mounted on the drive shaft of the motor 18 and the shaft of the cutter roll respectively. The pulley 25 which is driven by the motor 18 drives the pulley 26 through a belt 27, the position of which upon the pulleys 25 and 26 is varied by means of the belt shifter 28 which is actuated in either a forward or reverse direction by means of a small pilot motor 29 to the drive shaft of which it is connected by means of a worm 30 and a worm wheel 31 driven thereby.

The pilot motor 29 is provided with a pair of differentially wound field windings 32 and 33 which are respectively controlled by the directional contactors 34 and 35. The directional contactor 34 serves when operated to its closed position to connect the pilot motor 29 to a suitable source of power 36 in series relationship with the differential field winding 32 to provide for rotation of the motor in one direction, whilst the directional contactor 35 serves to connect the pilot motor to the source in series relationship with the differential field winding 33 to provide for rotation in the opposite direction.

As shown in the drawing, the sheet 10 is provided at suitable intervals with markings shown as black spots 37 and 38 which are preferably printed upon the strip when the design or other matter is printed thereon. These spots are all positioned on the strip in a predetermined relationship with respect to the printed design, or with respect to the cut-off lines 11 and 12.

No particular relationship between the position of the spots and the cut-off lines is necessary but it is essential that the same relationship obtain between each of the spots and the design or cut-off line with which it is associated.

The intervals at which the spots are placed upon the strip will be determined primarily by the speed at which the machine operates and it is to be noted that it is not essential that a spot should be placed at each section of the strip or at each cut off line in the manner illustrated in the drawing since the best results will be obtained by placing the spots at intervals which are multiples of the distances between the cut off lines 11 and 12; the particular multiple being dependent upon the distance between cut off lines and the speed of the machines.

The operation of the pilot motor 29 to actuate the variable speed transmission device 24 to vary the relative operating speeds of the cutter roll 15 and the strip 10 so as to maintain a predetermind relationship therebetween is automatically controlled by means of a control system shown in the drawing as comprising a light sensitive device 39 actuated by the markings 37, 38, etc. and cooperating with a switching device 40 controlled in accordance with the operation of the cutter roll 15 to energize one or the other of the electric discharge devices 41 and 42 in the respective output circuits of which the operating coils 43 and 44 of the directional contactors 35 and 34 are connected.

The light sensitive device 39 may be of any suitable type such for example as a photo-electric cell comprising an evacuated envelope 45 in which are mounted an anode 46 and a cathode 47 which are respectively connective to the positive and negative terminals of a direct current source of supply 48 by means of the conductors 49 and this device is mounted above the strip 10 in such a position with respect to a source of light 50 as to receive a beam of light reflected from the strip. As shown in the drawing, the source of light 50 comprises a lamp suitably mounted above the strip and supplied with energy from any suitable source of supply such for example as that represented in the drawing by the supply lines 20 to which the lamp 50 is connected by means of the conductors 51. The light sensitive device 39 is so positioned with respect to the cutter roll 15 that one of the black spots 37, 38 is in registry therewith when one of the cutting off lines 11, 12 of the strip is at the cut off point of the table 14.

When one of the black spots 37, 38 is in registry with the photo-electric cell 39 the amount of reflected light received from the strip 10 is diminished and as will be well understood by persons skilled in the art, this diminution of received light causes the photo-electric cell 39 to produce a controlling impulse in the electrical circuit 49 in which it is connected.

Since the impulses produced in the electrical circuit 49 when dark spots intercept the light transmitted to the photo-electric cell are very feeble, it is necessary to amplify these impulses in order that they may be utilized to control the energization of the electric discharge devices 41 and 42. Accordingly a suitable amplifying device 52 is interposed in the circuit between the photo-electric cell 39 and the electric discharge devices 41 and 42.

This amplifying device may be of any suitable type, such for example as that shown diagrammatically in Fig. 2 of the drawing. Briefly the amplifying device comprises an electric discharge device, in the highly evacuated envelope 53 of which are mounted an anode 54, a filamentary cathode 55 and a grid or control electrode 56. A resistance 57 of suitable ohmic value is connected in circuit between the cathode terminal 58 of the photo-electric cell and the negative terminal of the source 48 and the grid 56 of the amplifying tube is directly connected to the cathode terminal 58 by means of a conductor 59. A potentiometer resistance 60 is connected across the source 48 and the filamentary cathode 55 is connected to an intermediate point of this resistance by means of a conductor 61 so that the grid receives a bias which is slightly negative with respect to that of the cathode, and the cathode 55 is heated to the requested degree of incandescence by electrical energy received from a suitable source such, for example, as that represented in the drawing by the battery 62.

The anode terminal 63 of the amplifying tube is connected to the positive side of the source 48 in series relationship with a resistance 54a, one terminal of which is connected to an intermediate point of a potentiometer resistance 64 by means of a conductor 65, the opposite terminals of the resistance 64 being connected across the direct current source 66 from which the electric discharge devices 41 and 42 are energized.

Briefly the operation of the amplifying device is as follows: The diminution of light received by the light sensitive device 39 when a black spot 37 comes into registry therewith effects a reduction in the current flowing in the conductors 49 with the result that the potential of the terminal 58 and the grid 56 is rendered sufficiently negative to reduce the electric discharge between the cathode 55 and the plate 54 of the amplifying tube. This reduction in the flow of current in the plate or output circuit of the amplifying tube results in an increase in the potential of the anode terminal 63 which increase due to the characteristics of the tube is many times larger than the decrease in potential of the cathode terminal 58 of the photo-electric cell.

The switching device 40 is shown as comprising a disc formed of conducting material, the opposite halves 40a and 40b of which are electrically separated from each other by means of a diametrically disposed strip of insulating material 67. The disc 40 together with the rings 68 and 69 are mounted upon the shaft of the cutter roll 15 so as to rotate synchronously therewith. The rings 68 and 69 are separated from each other and from the shaft by means of insulation and the ring 68 is connected to the left hand half of the disc 40 by a conductor (not shown) whilst the conducting ring 69 is similarly connected to the right hand half of the disc 40 by means of a conductor (not shown).

The electric discharge devices 41 and 42 are shown as of the three-electrode type, the device 41 being provided with an anode 70, a grid 71 and a filamentary cathode 72 and the device 42 is similarly provided with an anode 73, a grid 74 and a filamentary cathode 75. Electrical energy for heating the filamentary cathodes 72 and 75 to the requisite degree of incandescence is supplied thereto from suitable sources of power such as those represented diagrammatically in the drawing by the batteries 76 and 77. Although the electric discharge devices 41 and 42 may be of any suitable type they are preferably of the three-electrode type as shown and into the envelopes of which a small quantity of inert gas such for example as mercury vapor is introduced after exhaust. The presence of the mercury vapor within the envelopes serves to change the usual electron discharge between the cathode and the anode into an arc stream the starting of which may be controlled by applying a suitable potential to the grid. Once the potential of the grid has been raised to the point necessary to start the electric discharge between the cathode and the anode, the current in the output or plate circuit rises abruptly to a value that is limited only by the impedance of the output circuit itself. Thereafter the grid is powerless to control the flow of current in the output circuit and accordingly the current in the output circuit can only be interrupted by interrupting the output circuit itself or by reducing the potential applied to the anode substantially to zero.

As previously pointed out, the electric discharge devices 41 and 42 are energized from a direct current source of supply 66. It will thus be seen that once the grids 71 or 74 have been rendered sufficiently positive to start current flowing in the output circuits of these devices, that the current will continue to flow until the output circuit has been interrupted. This is an important feature of the invention, since the controlling impulses produced by the passage of the black spots 37, 38, etc. beneath the photo-electric cell 39 are of a very brief duration, e. g., in practice approximately one one-hundredth of a second, which period is not sufficient for the satisfactory operation of electroresponsive devices having inductive circuits such as relays, contactors and the like. A positive impulse of this brief duration, however, is sufficient to initiate the flow of current in the output circuits of the electric discharge devices which current will then continue to flow and effect the operation of electroresponsive devices connected in the output circuit until the latter is interrupted.

The anodes 70 and 73 of the electric discharge devices 41 and 42 are respectively connected in circuit with the operating coils 43 and 44 of the directional contactors 35 and 34 to the positive side of the direct current source 66. A suitable switching device shown as comprising a disc 78 of conducting material insulatingly mounted on the shaft of the cutter 15 so as to rotate therewith and provided at a point on its periphery with a section 79 of insulating material serves to interrupt the output circuit of the electric discharge devices 41 and 42 a limited time after the initiation of current flow therein.

The grids 71 and 74 of the electric discharge devices 41 and 42 are each respectively connected to the conducting rings 68 and 69 which, as previously mentioned, are respectively connected to the portions 40a and 40b of the conducting disc.

The cathodes 72 and 75 of the electric discharge devices 41 and 42 are connected to the negative side of the supply source 66 which is connected to the positive side of the supply source 48 by means of the conductor 79a. The result of this connection is to bias the anode terminal 63 of the amplifying tube slightly positive with respect to the cathodes 72 and 75, the amount of this bias being determined by the position of the intermediate point on the potentiometer resistance 64 to which the resistance 54a is connected.

A conductor 80 serves to connect the anode terminal 63 of the amplifying tube to a brush 81 which makes contact with the periphery of the switching device 40, the opposite halves 40a and 40b of which are respectively connected to the grids 71 and 74 of the electric discharge devices 41 and 42.

With the above understanding of the elements and apparatus comprising the invention and with the elements in the position shown in the drawing, the operation of my system will be readily grasped and easily understood: Initially the strip 10 is threaded through the feeder rolls 16 and 17 and the contact 81 is so adjusted that it engages the insulating section 67 of the switching device 40 when the knife 23 engages the strip 10. As previously pointed out, the photo-electric cell 39 is mounted in such a position with respect to the cut off end of the table 14 that one of the black spots 37, 38 moves into a position to intercept the beam of light reflected from the strip when one of the cut off lines 11, 12 is at the cut off point of the table.

The electric motor 18 which drives the feed rolls 16 and 17 and the cutter roll 15 may be connected to the source 20 and started by means of any suitable switching device such for example as that represented by the reference character 82. Thereafter the feed rolls 16 and 17 will supply the strip 10 to the cutter roll 15 at the desired rate and as long as the desired predetermined relationship is maintained between the cutter roll and the strip, the above described control system will remain inactive since the brush 81 in the circuit of the photo-electric cell 39 will be in engagement with the insulating portion 67 each time that an impulse is produced in the control circuit by the passage of a black spot beneath the photo electric cell.

However, should the cutter roll 15 get out of step with the strip 10, i. e., cut the strip either before the cut off line 11, 12 has reached the cut off point, or after the cut off line has reached the point, the control system will function to vary the relative speeds of the cutter roll 15 and the strip 10 to reestablish this synchronous relationship. Assuming, for example, that the speed of the cutter roll 15 becomes decreased slightly so that the knife 23 cuts the strip 10 after the cut off line has passed the cut off point of the table the contact 81 will be in engagement with the left-hand portion 40a of the switching device 40 at the time that the black spot 37 intercepts the beam of light received by the photo-electric cell 39. This interception of the light received by the photo-electric cell will cause the current flowing in the conductor 49 to be decreased and the potential of the anode terminal 63 of the amplifying tube to be greatly increased in a positive direction (in a manner already described), and this positive potential will be applied to the grid 71 of the electric discharge device 41, the circuit being traced from the terminal 63 by the conductor 80, the brush 81, segment 40a, conducting ring 68 and thence to the grid 71. The increase in grid potential applied to grid 71 will initiate a flow of current in the anode circuit of the electric discharge device 41 sufficiently to energize the operating coil 43 of the directional contactor 35. Thereupon the contactor 35 moves to the upper or closed position in response to the energization of its coil and connects the armature of the pilot motor 29 to the source of supply 36 in series relationship with the differential field winding 33, and as a result the motor 29 starts up and actuates the belt shifter 28 in such a direction as to increase the speed of the cutter roll 15 relative to the speed of the strip 10.

The motor 29 is operative only for a very limited period of time since within a single revolution of the cutter roll 15 the insulating section 79 of the disc 78 is rotated into engagement with the brush which rests upon its periphery and thereby interrupts the anode circuit of the electric discharge device 41, thereby deenergizing the operating coil 43 of the contactor 35 permitting the latter to descend to its lower position in which it disconnects the motor 29 from the source 36 which thereupon comes to rest promptly.

Persons skilled in the art will understand from the above described operation that had the cutter roll 15 been "fast" with respect to the strip 10 so as to cause the knife 23 to sever the strip 10 before a cut off line of the strip arrived at the cut off point of the table, the brush 81 would be in engagement with the segment 40b at the time that a black spot 37 passed under the photoelectric cell 39 and consequently the electric discharge device 42 would be energized to close the contactor 34 and thereby cause the pilot motor 29 to rotate in the opposite direction so as to move the belt shifter 28 in a direction to decrease the speed of the cutter roll 15 relative to the speed of the strip.

Although in accordance with the provision of the patent statutes I have described my invention as embodied in concrete form, I would have it understood that the apparatus and connections shown are merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States, is:

1. In a control system for a machine having an element operating upon a moving strip of material in predetermined relationship with respect to markings thereon, means for driving said strip and said element at predetermined speeds, a light-sensitive device arranged to be responsive to the passage of said markings and a switching device cooperating with said light sensitive device to produce controlling impulses in response to variation of said strip from a predetermined relationship with respect to said elements, means responding to said impulses comprising an electric discharge device containing an ionizable medium and provided with an input circuit, and an output circuit connected to a direct current source so that said discharge device remains energized after the termination of an impulse, means for interrupting said output circuit to deenergize said discharge device after a predetermined interval of time, and means responsive to energization of said discharge device for reestablishing said predetermined relationship between said strip and said element.

2. In a control system for a machine having an element operating upon a moving strip of material provided with markings at predetermined intervals, means for operating said element and strip at predetermined speeds, an electric discharge device containing an ionizable medium, said device having an input circuit and an output circuit controlled thereby and energized from a direct current source, means including a light sensitive device for responding to the markings to transmit controlling impulses to said input circuit to effect controlling operations in said output circuit, means including an electroresponsive device connected to said output circuit for varying the relative operating speeds of the element and the strip in response to said controlling operations to cause said element and strip to operate in a predetermined relationship, and means including a switching device driven synchronously with the element for preventing the transmission of said controlling impulses when the element and strip are operating in said predetermined relationship.

3. A control system for a machine having an element operating upon a strip of material provided with markings at predetermined intervals, means for operating said element and strip at predetermined speeds, vapor electric discharge apparatus having an input circuit and an output circuit energized from a direct current source, means including a light sensitive device controlled by the markings on the strip and a switching device operated in accordance with the operation of the element to transmit controlling impulses to said input circuit and to initiate a controlling operation in said output circuit in response to variation of said element and said strip from a predetermined relationship, means including an electroresponsive device for responding to said controlling operation to vary the relative speeds of the strip and the element to reestablish said predetermined relationship, and means including a switching device for interrupting said output circuit after a time interval to limit said speed varying operation.

4. A control system for a machine provided with an element for performing an operation upon a moving strip of material in predetermined relationship with respect to markings thereon comprising means for driving said strip and said element at predetermined speeds, a control circuit, a light sensitive device arranged to be responsive to the passage of said markings for producing electrical impulses in said circuit, a pair of electric discharge devices adapted to be energized by said impulses, each of said discharge devices containing an ionizable medium and an input circuit and an output circuit connected to a direct current source whereby it remains energized after the termination of an impulse, switching means operated sychronously with said element for selectively connecting the input circuits to said control circuit thereby to energize one of said discharge devices in response to departure of said strip and element from a predetermined relationship with respect to each other, a switching device for interrupting said output circuits to deenergize said discharge devices after a predetermined time interval, and motor means responsive to selective energization of said discharge devices and means actuated thereby for effecting corrections in the relative speeds of said element and said strip thereby to restore said strip and said element to a predetermined relationship.

WILLIAM R. KING.